US012176823B2

(12) United States Patent
Robinson

(10) Patent No.: US 12,176,823 B2
(45) Date of Patent: Dec. 24, 2024

(54) FOUR-LEVEL POWER CONVERTER

(71) Applicant: Siemens Aktiengesellschaft, Munich (DE)

(72) Inventor: Jonathan Robinson, Nuremberg (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 195 days.

(21) Appl. No.: 17/915,969

(22) PCT Filed: Mar. 5, 2021

(86) PCT No.: PCT/EP2021/055534
§ 371 (c)(1),
(2) Date: Sep. 29, 2022

(87) PCT Pub. No.: WO2021/197755
PCT Pub. Date: Oct. 7, 2021

(65) Prior Publication Data
US 2023/0216428 A1 Jul. 6, 2023

(30) Foreign Application Priority Data
Apr. 2, 2020 (EP) .................................. 20167731

(51) Int. Cl.
H02M 7/483 (2007.01)
H02M 1/00 (2006.01)
H02M 7/487 (2007.01)

(52) U.S. Cl.
CPC ....... H02M 7/4837 (2021.05); H02M 1/0054 (2021.05); H02M 7/487 (2013.01)

(58) Field of Classification Search
CPC ... H02M 1/0054; H02M 7/487; H02M 7/4837
See application file for complete search history.

(56) References Cited

U.S. PATENT DOCUMENTS 4,467,407 A * 8/1984 Asano .................. H02M 7/487
363/43
6,459,596 B1 * 10/2002 Corzine .............. H02M 5/4585
363/127

(Continued)

FOREIGN PATENT DOCUMENTS

DE 10 2014 005124 9/2017 ............ H02M 7/797
WO WO-2015172851 A1 * 11/2015 ............. H02M 1/08

OTHER PUBLICATIONS

Search Report for International Application No. PCT/EP2021/055534, 11 pages, Apr. 13, 2021.

(Continued)

Primary Examiner — Thienvu V Tran
Assistant Examiner — Yahveh Comas Torres
(74) Attorney, Agent, or Firm — Slayden Grubert Beard PLLC

(57) ABSTRACT

Power converter for converting between a DC voltage and a AC voltage. The power converter may include: a DC link with a series of three capacitors, the outer nodes of the series forming an upper and a lower DC terminal and connection points between the capacitors forming an upper and a lower intermediate voltage node; and one or more phase legs. Each phase leg includes: an upper switch series between the upper DC terminal and the lower intermediate voltage node, with two semiconductor switches; a lower switch series between the lower DC terminal and the upper intermediate voltage node, with two semiconductor switches; and an inner switch series between the midpoints of the upper and the lower switch series, the inner switch series comprising two semiconductor switches, the midpoint forming an AC terminal of the power converter, wherein the semiconductor switches of the inner switch series are bidirectional semiconductor switches.

9 Claims, 3 Drawing Sheets

(56) References Cited

U.S. PATENT DOCUMENTS

| | | | | |
|---|---|---|---|---|
| 9,748,862 | B2* | 8/2017 | Cheng | H02M 7/487 |
| 10,063,162 | B2* | 8/2018 | Martini | H02M 7/487 |
| 2008/0197706 | A1* | 8/2008 | Nielsen | H02M 7/487 |
| | | | | 363/67 |
| 2016/0072499 | A1* | 3/2016 | Ichikawa | H02M 7/487 |
| | | | | 327/432 |
| 2016/0079233 | A1* | 3/2016 | Deboy | H01L 29/872 |
| | | | | 327/427 |
| 2017/0099013 | A1* | 4/2017 | Martini | H02M 7/487 |
| 2017/0256950 | A1 | 9/2017 | Kuai | H02J 3/38 |
| 2019/0238062 | A1* | 8/2019 | Lu | H02M 7/487 |

OTHER PUBLICATIONS

Search Report for EP Application No. 20167731.7, 5 pages, Sep. 17, 2020.

* cited by examiner

FOUR-LEVEL POWER CONVERTER

CROSS-REFERENCE TO RELATED APPLICATIONS

This application is a U.S. National Stage Application of International Application No. PCT/EP2021/055534 filed Mar. 5, 2021, which designates the United States of America, and claims priority to EP Application No. 20167731.7 filed Apr. 2, 2020, the contents of which are hereby incorporated by reference in their entirety.

TECHNICAL FIELD

The present disclosure relates to power converters. Various embodiments of the teachings herein may include a four-level power converter for converting between a DC voltage and a single-phase or multi-phase AC voltage.

BACKGROUND

Three-level ANPC (active neutral point clamped) converters offer interesting possibilities to optimize converter operation using inner high-frequency switched devices and outer low-frequency switched devices. Modules for such an application having SiC MOSFETS and Si IGBTs are available commercially. With a typical three-level ANPC, all devices are rated for the same voltage rating, leading to increased losses for the high-frequency switched devices.

Higher level NPC type converters such as four-level NPC converters offer more levels and thus lower noise but—depending on the topology used—at the cost of an increased device count. While some four-level topologies use a device count similar to a three-level ANPC converter, such topologies typically have switches rated for ⅓ $V_{DC}$ and other switches rated for ⅔$V_{DC}$, $V_{DC}$ being the DC link voltage and the ⅔ $V_{DC}$ switches require being switched at high frequencies of above 1 kHz leading to unwanted losses.

SUMMARY

Teachings of the present disclosure provide a power converter having reduced losses. For example, some embodiments include a power converter (10, 40) for converting between a first and second voltage, the first voltage being a DC voltage ($V_{DC}$) and the second voltage being a single-phase or multi-phase AC voltage, comprising: a DC link (16) with a capacitor series comprising three capacitors (191 . . . 193), the outer nodes of the capacitor series forming an upper and lower DC terminal (121, 122) of the power converter (10, 40) and the connection points between the capacitors forming an upper and lower intermediate voltage node (181, 182), one or more phase legs, each phase leg comprising: an upper switch series (20) arranged between the upper DC terminal (121) and the lower intermediate voltage node (182), the upper switch (20) series comprising two semiconductor switches (261, 262), a lower switch series (22) arranged between the lower DC terminal (122) and the upper intermediate voltage node (181), the lower switch series (22) comprising two semiconductor switches (263, 264), an inner switch series (24) arranged between the midpoints of the upper and the lower switch series (20, 22), the inner switch series (24) comprising two semiconductor switches (265, 266), the midpoint of the inner switch series forming an AC terminal (14) of the power converter (10, 40), wherein the semiconductor switches (265, 266) of the inner switch series (24) are bidirectional semiconductor switches (265, 266).

In some embodiments, the bidirectional semiconductor switches (265, 266) are integrated bidirectional switches (265, 266).

In some embodiments, the power converter (10, 40) further comprises a control unit, wherein the control unit is arranged to control the semiconductor switches (265, 266) of the inner switch series (24) to switch with a frequency of more than 1 kHz, particularly more than 5 kHz.

In some embodiments, the control unit is arranged to control the semiconductor switches (261 . . . 264) of the upper and/or lower switch series (20, 22) to switch with a frequency of less than 1 kHz, particularly less than 500 Hz.

In some embodiments, the semiconductor switches (265, 266) of the inner switch series (24) have a voltage rating of less than ⅔ of the DC voltage ($V_{DC}$).

In some embodiments, the semiconductor switches (265, 266) of the inner switch series (24) are optimized for low switching losses.

In some embodiments, the semiconductor switches (265, 266) of the inner switch series (24) are SiC switches or GaN switches.

In some embodiments, the switches (261 . . . 264) of the upper and/or lower switch series (20, 22) are optimized for low conduction losses.

In some embodiments, the switches (261 . . . 264) of the upper and/or lower switch series (20, 22) are Si IGBT devices.

In some embodiments, the power converter (10, 40) further comprises one or more additional inner switch series (411, 412) arranged in parallel to the inner switch series (24), wherein the control unit is arranged to control the semiconductor switches (265, 266) of the inner switch series (24) and the additional inner switch series (411, 412) for interleaved operation.

In some embodiments, the inner switch series (24), the upper switch series (20) and/or the lower switch (22) series comprises exactly two semiconductor switches (261_266).

BRIEF DESCRIPTION OF THE DRAWINGS

Various embodiments of teachings of the present disclosure are now described with reference to the accompanying drawings to which the disclosure is not limited. The illustrations of the drawings are in schematic form. It is noted that in different figures, similar or identical elements use the same reference signs.

DETAILED DESCRIPTION

Figure 1:
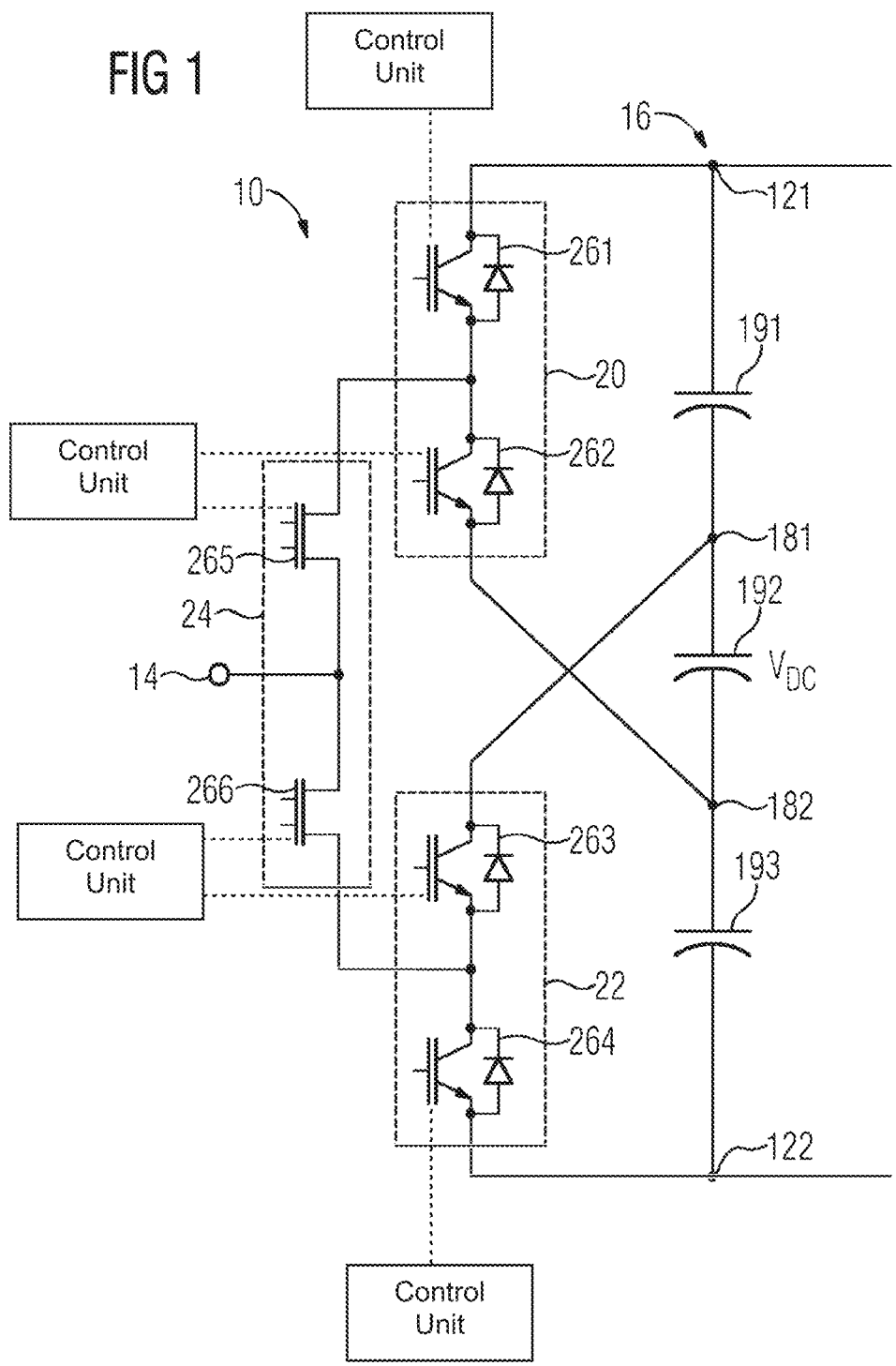
FIG. 1 illustrates a first embodiment of a power converter incorporating teachings of the present disclosure.

In some embodiments, a power converter incorporating teachings of the present disclosure is suitable for converting between a first and second voltage, wherein the first voltage is a DC voltage and the second voltage is a single-phase or multi-phase AC voltage. The power converter comprises a DC link with a capacitor series comprising three capacitors, the outer nodes of the capacitor series forming an upper and lower DC terminal of the power converter and the connection points between the capacitors forming an upper and lower intermediate voltage node. The upper intermediate voltage node is connected to the upper DC terminal across a single of the capacitors and the lower intermediate voltage node is connected to the lower DC terminal across a single of the capacitors.

The power converter further comprises one or more phase legs, the phase legs corresponding to the phases of the AC voltage and being arranged in a parallel connection if there are at least two phase legs.

Each phase leg comprises an upper switch series arranged between the upper DC terminal and the lower intermediate voltage node, the upper switch series comprising two semiconductor switches. It further comprises a lower switch series arranged between the lower DC terminal and the upper intermediate voltage node, the lower switch series comprising two semiconductor switches.

Each phase leg also comprises an inner switch series arranged between the midpoints of the upper and the lower switch series, the inner switch series comprising two semiconductor switches. The midpoint of the inner switch series forms an AC terminal of the phase leg and thus of the power converter. The semiconductor switches of the inner switch series are bidirectional semiconductor switches. Bidirectional switches are devices that can isolate voltage in both directions in a manner that is sufficient for operation at both voltage polarities. Bidirectional switches may for example be formed by an anti-serial connection of two individual semiconductor switches or by integrated bidirectional devices.

In some embodiments, the power converter uses a switching scheme wherein the semiconductor switches of the outer switch series provide two of the available four DC voltages of the DC link that have a voltage difference of ⅓ of the DC voltage to the terminals of the inner switch series.

The inner switch series uses pulse width modulation to form an AC voltage from the provided DC voltages. Thus, a control unit of the power converter may be arranged to control the semiconductor switches of the inner switch series to switch with a frequency of more than 1 kHz, particularly more than 5 kHz.

The semiconductor switches of the outer, that is the upper and lower switch series, on the other hand only need to change their conduction state twice in one period of the AC line frequency. Therefore the control unit is preferably arranged to control the semiconductor switches of the upper and/or lower switch series to switch with a frequency of less than 1 kHz, particularly less than 500 Hz, particularly at a frequency of e.g. 50 Hz or 60 Hz.

The AC voltage is thus generated from four different DC voltages and the power converter is a four-level converter. Between two AC phases of a multi-phase power converter this results in seven different levels, resulting in a power converter with an improved AC voltage quality over a three-level converter at a device count that is similar or equal to a three-level NPC topology.

When the DC voltages of the two intermediate DC voltage nodes are connected to the inner switch series, the polarity of the voltage is reversed, meaning that an upper terminal of the inner switch series receives the lower of the DC voltages. The bidirectional semiconductor switches of the inner switch series handle this reversed polarity.

In some embodiments, the bidirectional semiconductor switches may be integrated bidirectional switches. This means that the bidirectional switches do not each comprise two individual semiconductor switches arranged in an anti-serial or other connection but that each of the bidirectional switches is built as a single semiconductor element. This single semiconductor element may be symmetrical in its electrical behavior. It may feature two gate terminals for control. This reduces the voltage drop occurring over a dual anti-serial switch and thus electrical losses. Also, when using integrated bidirectional switches the power converter uses only six individual semiconductor switches per phase leg to achieve a four level AC voltage conversion with the accompanying lower harmonic content of the AC voltage over comparable three-level topologies.

In some embodiments, the semiconductor switches of the inner switch series may have a voltage rating of less than ⅔ of the DC voltage $V_{DC}$. In other words they may not be suitable for isolating ⅔ of the DC voltage. In some embodiments, they are suitable for operation at ⅓ of the DC voltage. The semiconductor switches of the inner switch series switch at a comparatively high frequency to conduct the pulse width modulation, incurring switching losses the magnitude of which depends on their voltage rating. In the present topology the semiconductor switches of the inner switch series conduct their switching at high frequency but at the same time, advantageously, they only need to be rated for ⅓ of the DC voltage, as the switches of the upper and lower switch series will always keep the voltage difference at the terminals of the inner switch series at ⅓ $V_{DC}$, although both polarities are present during an AC voltage period.

In some embodiments, the semiconductor switches of the upper and lower switch series, on the other hand, are preferably rated for at least ⅔ of the DC voltage but these switches only switch at a low frequency.

In some embodiments, the semiconductor switches of the inner switch series may be optimized for low switching losses, for example by using SiC (silicon carbide) or GaN switches. The semiconductor switches of the upper and/or lower switch series may be optimized for low conduction losses, for example by using Si IGBT devices. In this way losses of the power converter can further be reduced.

In some embodiments, the power converter may comprise one or more additional inner switch series arranged in parallel to the inner switch series. In addition, the control unit may be arranged to control the semiconductor switches of the inner switch series and the additional inner switch series for interleaved operation. Interleaved operation increases the number of levels attainable as well as the available maximum current.

In some embodiments, the inner switch series, the upper switch series and/or the lower switch series may comprise exactly two semiconductor switches per series.

In some embodiments, the elements described as "semiconductor switches" of the power converter are individual semiconductor elements, i.e. single switches each. In these embodiments the number of semiconductor switches may indeed be as low as six switches per phase. In other embodiments, some or each of the elements described as "semiconductor switches" of the power converter are multiple switches arranged in a parallel or serial connection and acting together as if they were a single switch of enhanced voltage rating or current capability. While the number of switching elements as defined by their function in the power converter remains unchanged, the actual number of semiconductor elements making up these switching elements in these embodiments is higher than six per phase.

FIG. 1 illustrates a power converter 10 incorporating teachings of the present disclosure. Power converter 10 is a single phase DC/AC converter comprising a first and second DC terminal 121, 122 and an AC terminal 14. Thus the circuitry between the DC terminals 121, 122 and the AC terminal 14 constitutes a single phase leg. A multi-phase converter according to another embodiment of the invention can be constructed using multiple such phase legs in parallel. In some embodiments, a three-phase converter can be assembled using three phase legs and driving the semiconductor switches of the phase legs to produce AC voltages that are phase shifted by 120° with respect to each other.

The power converter 10 comprises a DC link 16 that is divided to provide four DC voltage levels. Power converter 10 thus uses the upper and lower DC voltage connected to the DC terminals 121, 122 and an upper and lower intermediate DC voltage that is provided at an upper and lower intermediate DC node 181, 182. The DC link 16 comprises three identical capacitors 191 . . . 193 in a series connection between the DC terminals 121, 122 to provide the intermediate DC voltages. It is to be understood that the upper intermediate DC node 181 is connected to the upper DC terminal 121 across a single, first of the capacitors 191 and thus the upper intermediate DC voltage is $\tfrac{2}{3}\,V_{DC}$.

Power converter 10 further comprises an upper, a lower and an inner switch series 20, 22, 24. Each of these switch series 20, 22, 24 is a half-bridge arrangement of exactly two semiconductor switches in a serial connection. Each of the switch series 20, 22, 24 has two outer terminals at respective ends of the serial connection and a middle terminal between the two semiconductor switches.

The upper switch series 20 is connected to the upper DC terminal 121 with one of its outer terminals. It is further connected to the lower intermediate DC voltage node 182 with its other outer terminal.

The lower switch series 22 is connected to the lower DC terminal 122 with one of its outer terminals. It is further connected to the upper intermediate DC voltage node 181 with its other outer terminal. The upper and lower switch series 20, 22 thus form a crossing connection to the intermediate DC voltage nodes 181, 182. Power converter 10 can therefore be called a cross-connected 4-level ANPC type converter.

The semiconductor switches of the upper switch series 20 are IGBT devices 261, 262. The semiconductor switches of the lower switch series 22 are also IGBT devices 263, 264. These IGBTs 261 . . . 264 are arranged in identical orientation. As is well known in the art, it is advantageous to have a parallel freewheeling diode for such IGBTs 261 . . . 264.

The inner switch series 24 comprises two integrated bidirectional switches 265, 266. Integrated bidirectional switches 265, 266 are semiconductor switches that operate independently of the current direction and can block voltages of the switch's voltage rating of either polarity. Also, they are formed as a single semiconductor device, i.e. not as module or other assembled structure containing two separate semiconductor switches. An example for such devices are Panasonic's single chip bi-directional (4-quadrant) GaN switches.

The inner switch series 24 is connected to the middle terminal of the upper switch series 20 and to the middle terminal of the lower switch series 22 with its respective outer terminals. The middle terminal of the inner switch series 24 is connected to the AC terminal 14.

The power converter 10 also comprises a control unit arranged to control the gate voltages of the semiconductor switches 261 . . . 266 to control their respective conduction states and thus control the conversion between the DC voltage and the AC voltage.

During operation of power converter 10, the control unit determines if the instantaneous value of the AC voltage falls into the upper third, the middle third or the lower third of the AC phase voltage range. As long as it is within the upper third of the AC voltage range, the upper IGBT 261 of the upper switch series 20 and the upper IGBT 263 of the lower switch series are kept in a conducting state, i.e. turned on. The lower IGBTs 262, 264 of the upper and lower switch series 20, 22 are turned off.

The semiconductor switches 265, 266 of the inner switch series 24 are switched in a pulse width modulation to approximate the instantaneous AC voltage from the two DC voltages that are present at the outer terminals of the inner switch series 24 which are the DC voltages of the upper DC terminal 121 and the upper intermediate DC voltage node 181, i.e. $V_{DC}$ and $\tfrac{2}{3}\,V_{DC}$, assuming values of $V_{DC}$ and 0 V, respectively, for the DC terminals 121, 122.

As long as the instantaneous value of the AC voltage is within its middle third, the lower IGBT 262 of the upper switch series 20 and the upper IGBT 263 of the lower switch series are kept in a conducting state, i.e. turned on, while the other two IGBTs 261, 264 are turned off. Again, the semiconductor switches 265, 266 of the inner switch series 24 are switched in a pulse width modulation to approximate the instantaneous AC voltage from the two DC voltages that are present at the outer terminals of the inner switch series 24 which are now the DC voltages of the upper and lower intermediate DC voltage node 181, 182, i.e. $\tfrac{1}{3}\,V_{DC}$ and $\tfrac{2}{3}\,V_{DC}$.

As the connections to the intermediate DC voltage node 181, 182 are crossed, the voltage across the inner switch series 24 has a reversed polarity. The integrated bidirectional switches 265, 266 of the inner switch series 24 can advantageously handle this reversed polarity without the need for additional switches or a different control scheme.

As long as the instantaneous value of the AC voltage is within its lower third, the lower IGBTs 262, 264 of the upper and lower switch series 20, 22 are turned on, while the other two IGBTs 261, 263 are turned off. The two DC voltages that are present at the outer terminals of the inner switch series 24 are now the DC voltages of the lower intermediate DC voltage node 182 and the voltage of the lower DC terminal 122, i.e. $\tfrac{1}{3}\,V_{DC}$ and 0 V.

As may be seen from the described control scheme for the semiconductor switches 261 . . . 266, the IGBTs 261 . . . 264 need to change their conduction state only twice over an AC voltage period, i.e. their switching frequency is equal to the AC voltage frequency. For a grid connection or a grid-like AC network this means that the IGBTs 261 . . . 264 switch with a frequency of 50 Hz or 60 Hz, i.e. a low frequency.

The switches 265, 266 of the inner switch series 24 on the other hand perform a pulse width modulation to approximate the AC voltage from the DC voltages applied across the inner switch series 24 and thus need to switch at a considerably higher frequency such as 6 kHz or 30 kHz or 100 kHz. It is therefore advantageous to use semiconductor switches optimized for low switching losses in the inner switch series 24, for example GaN switches.

It may further be seen from the above description that the voltage that is present across the inner switch series 24 may have both polarities but is always of the magnitude of $\tfrac{1}{3}\,V_{DC}$. The semiconductor switches 265, 266 may thus be chosen to have a voltage rating sufficient for $\tfrac{1}{3}\,V_{DC}$ but not sufficient for $\tfrac{2}{3}\,V_{DC}$. This in turn reduces the switching losses incurred by those devices. This is an improvement over other 4-level and 3-level ANPC converters where typically devices with a voltage rating of $\tfrac{2}{3}\,V_{DC}$ need to be switched at high frequency.

The IGBTs 261 . . . 264 on the other hand need to isolate a voltage of $\tfrac{2}{3}\,V_{DC}$ and thus need to be chosen with at least this voltage rating. If their switching frequency is low, however, they incur low losses.

The resulting converter operation achieves 4 voltage levels or 7 levels considering the phase-to-phase voltage in a multi-phase converter, which will allow improved harmonic performance for the same switching frequency as a 3-level NPC. In addition, the number of devices—6 semiconductor switches 261 . . . 266 per phase leg—is not increased over a 3-level ANPC.

Figure 2:
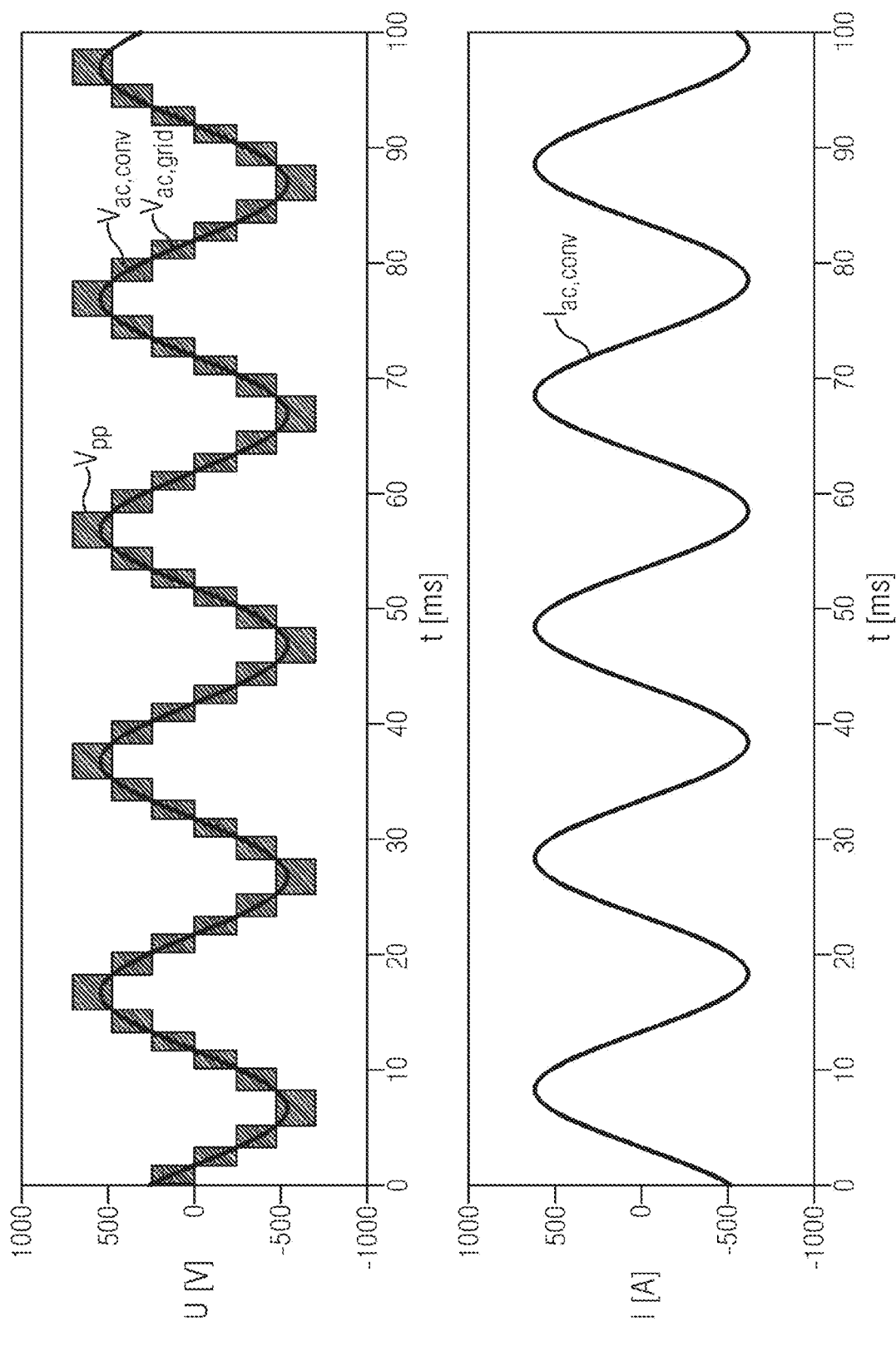
FIG. 2 illustrates simulation results for the power converter for FIG. 1.

FIG. 2 shows a simulation result for a grid-connected power converter 10 incorporating teachings of the present disclosure. It uses a 700 V DC link voltage $V_{DC}$, is connected to a 400 VAC grid, and operates at 36 kW. The phase-to-phase voltage $V_{PP}$ has seven levels and the simulation result shows a harmonic content that is better than what a three-level converter with its 5 phase-to-phase levels can typically achieve at the same switching frequency.

Compared to three-level NPC topologies of the prior art the present converter 10 achieves a higher number of levels and therefore a lower harmonic content as well as lower device losses. When compared to many four-level topologies known in the art it has a lower device count of only six devices per phase. Compared to those four-level topologies of the prior art that also use six devices per phase the present power converter 10 has lower devices losses as only devices of a ⅓ $V_{DC}$ rating need to switch at high frequency.

Figure 3:
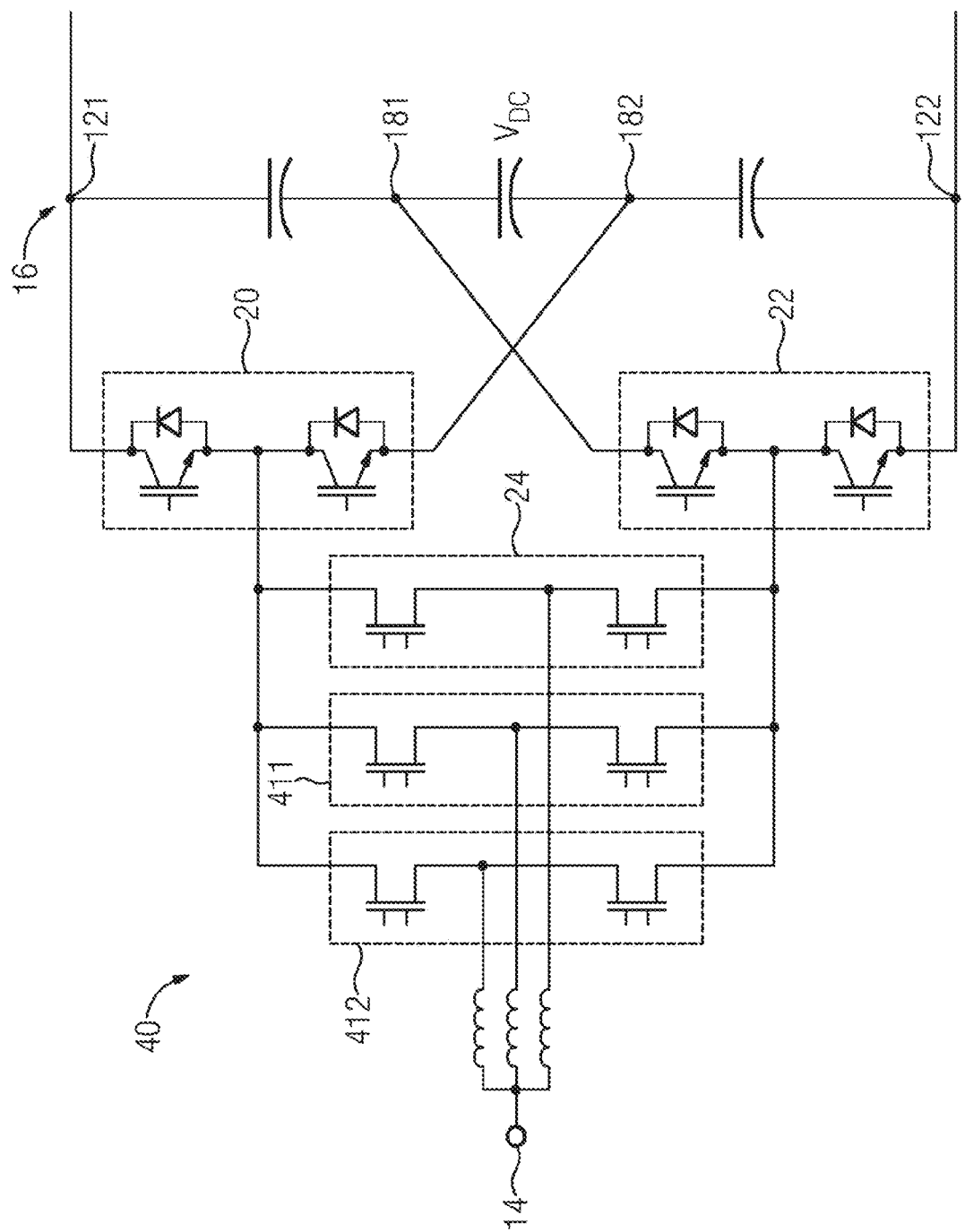
FIG. 3 illustrates a second embodiment of a power converter incorporating teachings of the present disclosure.

FIG. 3 shows a second embodiment of the teachings herein in the form of power converter 40. Power converter 40 comprises the elements of power converter 10 with some additions. As an addition to the phase leg of power converter 10 power converter 40 comprises two additional inner switch series 411, 412. The additional inner switch series 411, 412 comprise the same elements as inner switch series 24. All three inner switch series 24, 411, 412 are arranged in a parallel connection.

The middle terminals of the three inner switch series 24, 411, 412 are interconnected across one inductive element for each of the inner switch series 24, 411, 412. The inductive elements may be coupled to form a common inductor. The far sides of the inductive elements from a single AC terminal 14 for the phase leg shown in FIG. 3.

The inner switch series 24, 411, 412 are controlled by the control unit to operate in an interleaved manner, i.e. the semiconductor switches of one of the inner switch series 24, 411, 412 are operated with a phase shift with respect to the other inner switch series 24, 411, 412. In this topology only the semiconductor switches 265, 266 are interleaved, while the high voltage IGBTs 261 . . . 264 are still switched at the same low frequency. Interleaving increases the number of available levels and achieves higher current ratings.

Instead of two additional inner switch series 411, 412 any other number of additional inner switch series 411, 412 can be used and operated in interleaved mode. As with power converter 10 multiple phase legs—each with multiple inner switch series 24, 411, 412—are used for a multi-phase interleaved power converter 40.

LIST OF REFERENCE NUMBERS

10, 40 power converter
121, 122 DC terminal
14 AC terminal
16 DC link
181, 182 intermediate DC node
191 . . . 193 capacitor
20 upper switch series
22 lower switch series
24 inner switch series
261 . . . 264 IGBT devices
265, 266 bidirectional switches
VDC DC link voltage
VPP phase-to-phase voltage
411, 412 additional inner switch series

What is claimed is:

1. A power converter for converting between a first DC voltage and a second AC voltage, the power converter comprising:
    a DC link with a capacitor series comprising three capacitors, wherein the outer nodes of the capacitor series form an upper DC terminal and a lower DC terminal and connection points between the capacitors form an upper intermediate voltage node and a lower intermediate voltage node; and
    one or more phase legs, each phase leg comprising:
        an upper switch series arranged between the upper DC terminal and the lower intermediate voltage node, the upper switch series comprising two semiconductor switches;
        a lower switch series arranged between the lower DC terminal and the upper intermediate voltage node, the lower switch series comprising two semiconductor switches; and
        an inner switch series arranged between the midpoints of the upper switch series and the lower switch series, the inner switch series comprising two semiconductor switches, the midpoint of the inner switch series forming an AC terminal of the power converter, wherein the semiconductor switches of the inner switch series are bidirectional semiconductor switches; and
    a control unit to control the semiconductor switches of the inner switch series to switch with a frequency greater than 1 kHz and to control the semiconductor switches of the upper switch series and/or the lower switch series to switch with a frequency of less than 1 KHz.

2. The power converter of claim 1, wherein the bidirectional semiconductor switches comprise integrated bidirectional switches.

3. The power converter of claim 1, wherein the semiconductor switches of the inner switch series have a voltage rating of less than ⅔ of the DC voltage.

4. The power converter of claim 1, wherein the semiconductor switches of the inner switch series are optimized for low switching losses.

5. The power converter of claim 1, wherein the semiconductor switches of the inner switch series comprise SiC switches or GaN switches.

6. The power converter of claim 1, wherein the switches of the upper switch series and/or the lower switch series are optimized for low conduction losses.

7. The power converter of claim 1, wherein the switches of the upper switch series and/or lower switch series comprise Si IGBT devices.

8. The power converter of claim 1, further comprising one or more additional inner switch series arranged in parallel to the inner switch series;
    wherein the control unit is further arranged to control the semiconductor switches of the inner switch series and the additional inner switch series for interleaved operation.

9. The power converter of claim 1, wherein the inner switch series, the upper switch series, and/or the lower switch series comprise exactly two semiconductor switches.

* * * * *